United States Patent [19]

Kay

[11] 4,062,569
[45] Dec. 13, 1977

[54] PIPE JOINTS

[76] Inventor: Francis Xavier Kay, 30 Sheep St., Winslow, Bucks., England

[21] Appl. No.: 669,448

[22] Filed: Mar. 23, 1976

[30] Foreign Application Priority Data

Mar. 24, 1975 United Kingdom ............... 12285/75

[51] Int. Cl.² ............................................. F16L 35/00
[52] U.S. Cl. ....................................... 285/4; 285/150; 285/423
[58] Field of Search .................. 285/130, 131, 3, 4, 285/150, 137 R, 423, 177; 137/271; 46/24, 25, 26

[56] References Cited

U.S. PATENT DOCUMENTS

| | | | |
|---|---|---|---|
| 2,787,480 | 4/1957 | Staller | 285/238 |
| 2,834,368 | 5/1958 | Gray | 137/271 |
| 3,470,893 | 10/1969 | Nelson | 285/3 X |
| 3,589,387 | 6/1971 | Raymond | 137/271 |
| 3,654,965 | 4/1972 | Gramain | 285/4 X |
| 3,817,561 | 6/1974 | Kay | 285/177 |
| 3,888,518 | 6/1975 | Delessert | 285/137 R |
| 3,917,318 | 11/1975 | Legris | 285/150 |
| 3,934,605 | 1/1976 | Legris | 137/271 |

Primary Examiner—Dave W. Arola
Attorney, Agent, or Firm—Kurt Kelman

[57] ABSTRACT

Pipe joints are effected by means of a connector unit in the form of a block, that may be moulded of plastics material, having a pair of opposed parallel faces each formed with a blind coupling port separated from an internal passage by a plug or knock-out diaphragm, the passage joining a pair of pipe-receiving ports that are preferably disposed in edge faces of the block. The connector units may be stacked to form a multiple unit with the internal passage of each unit connected to its neighbors through opened coupling ports.

10 Claims, 12 Drawing Figures

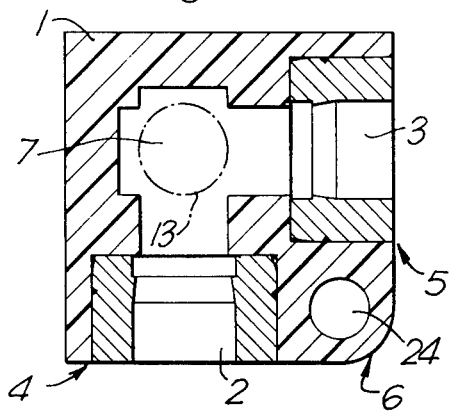
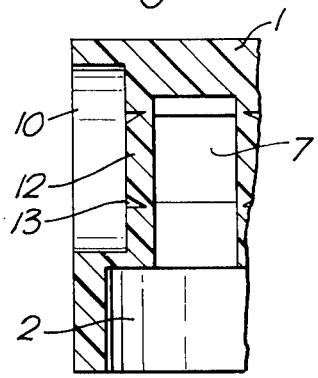
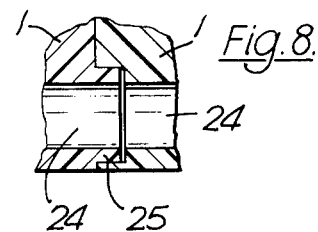
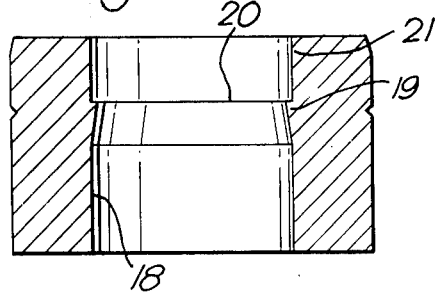
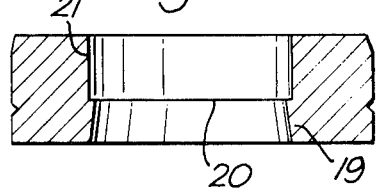

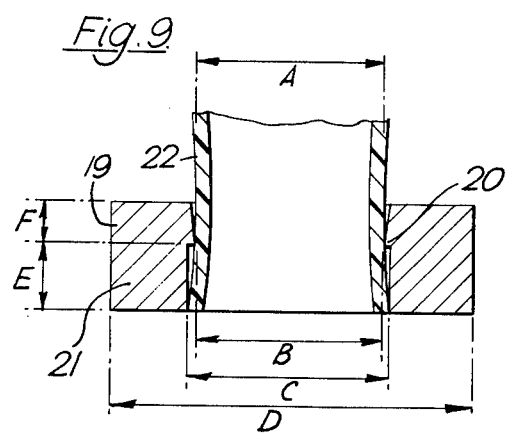
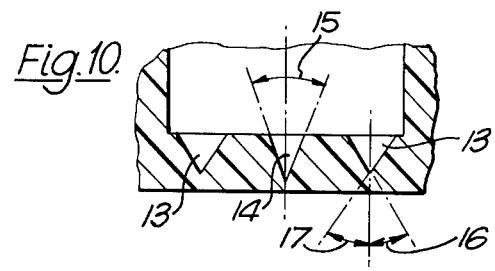
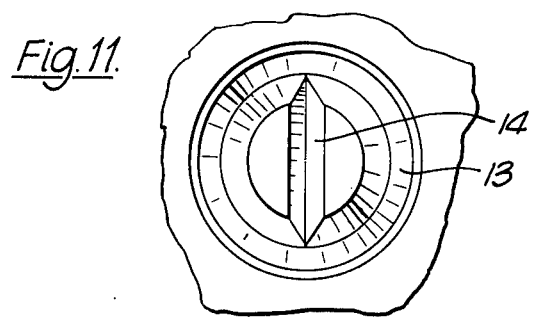
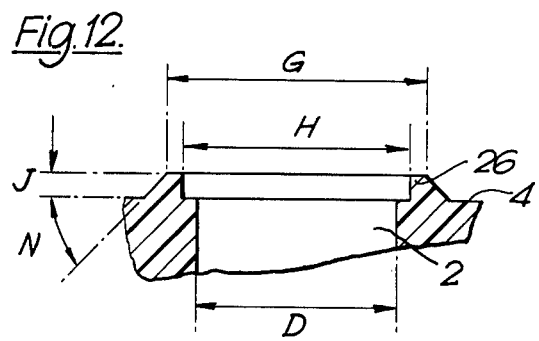

PIPE JOINTS

FIELD OF THE INVENTION

This invention concerns pipe joints, having as its objective the provision of a connector unit capable of establishing connection between a pair of pipes and, if required, with additional pipes or fittings through the intermediary of one or more like connector units and/or adaptor units coupled together.

SUMMARY OF THE INVENTION

A pipe connector unit comprises a block having a pair of opposed parallel faces each formed with a blind coupling port, said block having further a pair of pipe-receiving ports interconnected by a passage extending between said blind coupling ports.

Preferably said blind coupling ports are aligned so as to facilitate coupling of two or more connector units by said ports.

The said pipe-receiving ports may also be aligned, being for instance respectively disposed in opposed edge faces of the block, but preferably these ports are disposed with their axes intersecting at an angle other than 180°, the ports being for instance respectively arranged in adjacent edge faces of the block. In preferred embodiments of the invention the block is of generally prismatic form with the pipe-receiving ports disposed in adjacent edge faces that are at rightangles to one another so that the port axes intersect at 90°.

By the use of a connector unit in accordance with the invention, a pair of pipes may be connected by having their ends sealingly received in the pipe-receiving ports of the unit, a single unit thus sufficing to join these pipes. However, by opening one blind coupling port of each of a pair of such connector units so that these ports communicate with the passages interconnecting the pipe-receiving ports of their respective units, and joining the units with their opened coupling ports interconnected, two pairs of pipes connected by the respective connector units may be brought into communication with one another: in similar manner a group of connector units may be disposed in side by side arrangement with their adjacent coupling ports opened and interconnected so as thereby to provide for the interconnection of a multiplicity of pipes.

The pipe-receiving ports of a connector unit may be adapted for connection in any convenient manner to pipes received thereby. Thus, for instance, the ports may be screw threaded, externally or internally, to co-operate with complementary nuts constituting part of a compression-type pipe joint, or the said ports may be formed with external or internal barbs for engagement with pipes of soft or resilient material, for instance rubber or a plastics material such as polyethylene. In preferred embodiments of the invention, the said pipe-receiving ports are internally barbed or fitted with internally barbed inserts to engage the exterior of flexible pipes of soft or resilient material.

The blind coupling ports may be formed in any suitable manner to permit of interconnection of two connector units in juxtaposition. A convenient form for these coupling ports is one having an internal barb, integral or formed in an insert in the port, to engage with the exterior of a short length of soft or resilient pipe material. However, such ports may be screw threaded to receive complementarily threaded adaptors.

In preferred forms of the invention, the connector unit is provided, on its said opposed parallel faces, with complementary locating dowels and recesses for location of adjacent connector units in stacked juxtaposition. If the connector units are formed of a slightly resilient material, such locating arrangements may have an interference fitting or be arranged for snap connection to hold juxtaposed units together. However, conveniently these locating arrangements are coaxial with a through-passage through which a fixing bolt may be passed to secure a stack of two or more connector units in juxtaposition as required, or to provide a convenient means for attaching a connector unit or a stack of juxtaposed units to a supporting structure such as a bulkhead.

The connector unit may be constructed of any suitable material and may, for instance, be formed of metal as by diecasting. However, preferably the connector unit is formed of a synthetic material, such as glass-filled polycarbonate or a nylon (polyamide) material, for instance by an injection moulding process.

In preferred forms of the invention in which the connector unit is a prismatic block of, for instance, a plastics material, the pipe-receiving ports are disposed in adjacent edge faces of the block at positions remote from the block corner joining such edge faces of the block, these ports being connected internally by a suitable passage that is preferably of rectangular cross-section having two opposite walls parallel with the opposed parallel faces of the block so as to enable the blind coupling ports to be separated from the passage by a knock-out diaphragm of block material. However, the blind coupling ports could be patent and plugged, the passage cross-sectional shape then being unimportant.

THE DRAWINGS AND DESCRIPTION OF PREFERRED EMBODIMENT

A preferred embodiment is illustrated in the accompanying drawings, in which:

FIG. 4 is a sectional elevation of a unit block in the plane of its pipe-receiving ports;

FIG. 5 is an enlarged fragmentary section illustrating the construction of a blind coupling port in the unit block;

FIG. 6 is an axial section of one form of internally barbed insert for a pipe-receiving port of the unit block;

FIG. 7 is an axial section of another form of internally barbed insert, for a coupling port;

FIG. 8 is an enlarged fragmentary section illustrating the locating arrangements of juxtaposed unit blocks;

FIG. 9 is a view corresponding with FIG. 7 and showing a preferred form of internally barbed insert and a pipe engaged thereby;

FIGS. 10 and 11 are respectively a section and a plan view of a preferred form of knock-out diaphragm in a blind coupling port of the unit block; and FIG. 12 is a fragmentary sectional view of the preferred unit block formation in the region of a port that is to receive an internally barbed insert.

Figure 1:
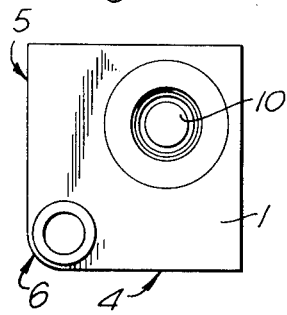
FIG. 1 is a side elevation of a connector unit block embodying the invention.

The drawings illustrate a preferred embodiment in which the connector unit is a prismatic block 1 injection-moulded from a plastics material, such as, for instance, glass-filled polycarbonate, having pipe-receiving ports 2, 3 disposed in adjacent edge faces 4, 5 respectively at positions remote from the block corner 6 joining such edge faces 4, 5. The ports 2, 3 are interconnected internally by a passageway 7 that is of rectangular cross-section having two opposite walls parallel with the opposed parallel side faces 8, 9 of the block 1. The passage 7 comprises intersecting passage portions extending axially of the ports 2, 3 respectively.

The connector unit block 1 is formed with blind coupling ports 10, 11 in its side faces 8, 9, these ports being aligned and disposed with their axes at rightangles to the axis of the passage 7 at the intersection of the two passage portions constituting the latter.

As best seen in FIG. 5, each coupling port 10, 11 is sealed from the passage 7 by a knock-out diaphragm 12 defined within a circular groove 13 and bounding the passage. In the configuration shown in FIG. 5, the outer wall of the groove 13 is cylindrical and its inner wall is inclined, for instance at an angle of up to about 30° to the axis of the port 10, but both walls may be inclined in the manner indicated, for instance, in FIG. 10. Moreover, as shown in FIGS. 10 and 11, the diaphragm 12 may be formed with a transverse groove 14 so that when the diaphragm is struck by an appropriate tool it "folds" and breaks into two small pieces that may readily be removed from the passage 7. When the preferred arrangement of FIGS. 10 and 11 is adopted the groove 14 preferably has its walls inclined at an angle 15 in the range 30° to 90°. The angles 16 and 17 indicated in FIG. 10 may each range in value from 0° to 30° with a sum greater than zero.

The connector unit block 1 is designed to have its ports fitted with internally barbed inserts to engage and hold pipes therein. FIGS. 6 and 7 illustrate two forms of internally barbed insert, that of FIG. 6 differing from that of FIG. 7 by including an internally cylindrical entry section 18. Apart from this difference the inserts of FIGS. 6 and 7 are similar, each including an internally tapered section 19 terminating in a step 20 at its junction with an internally cylindrical section 21. The step 20 may be circumferentially continuous or it may be notched to provide regions of high local pressure acting upon the external wall of a flexible pipe introduced into the insert in the manner illustrated in FIG. 9.

The configuration and dimensions of an internally barbed insert such as shown in FIG. 6 or FIG. 7 are selected in accordance with the nominal dimensions and the material of the flexible pipe to be retained by such an insert. The insert may be made of any suitable material, such as the diecasting material known under the Trade Mark MAZAK, a metal such as aluminium or brass, or a relatively rigid plastics material such as a polycarbonate or a phenol-formaldehyde resin.

FIG. 9 illustrates the appropriate configuration and proportions for an insert, of the form shown in FIG. 7, for retaining a flexible pipe made of a material such as polyethylene, polypropylene or a polyamide such as nylon. Such a pipe is shown at 22 in FIG. 9, its nominal OD being indicated by the dimension A. The marked dimensions B (the internal diameter of the step 20); C (the internal diameter of the section 21); D (the external diameter of the insert 21); E (the length of the section 21) and F (the length of the portion 19) are all related to the dimension A in the manner shown in the following Table 1.

TABLE 1

| Dimension | Minimum | Maximum |
| --- | --- | --- |
| B | 0.90A | 0.97A |
| C | 1.07A | 1.20A |
| E | 0.20A | 0.55A |
| F | A | 3A |

An insert of the form shown in FIG. 6 may be accommodated in each of the pipe-receiving ports 2, 3 of the connector unit block 1, these ports having adequate depth to accommodate an insert of this form with its entry section 18 that serves to limit flexing of an inserted pipe in the region of the shoulder 20. However, an insert of the form shown in FIG. 7 is preferred for the coupling ports 10, 11 and may also be used in the pipe-receiving ports 2, 3.

Figure 3:
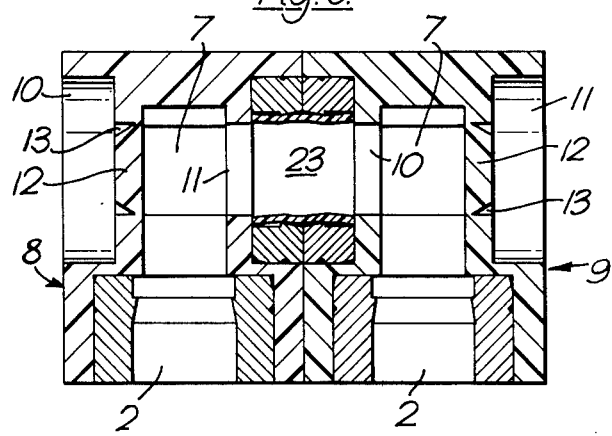
FIG. 3 is a sectional elevation in the plane of the coupling port axes of a pair of the connector unit blocks juxtaposed with a coupling pipe interconnecting such blocks.

FIG. 3 shows a pair of connector unit blocks 1 juxtaposed and interconnected by means of a connector pipe 23 extending between the adjacent coupling ports 10, 11 of the two units and from which adjoining diaphragms 12 have been removed so that the passages 7 of the two units are interconnected. The coupling pipe 23 may be a short length of flexible pipe or it may be a tubular moulding in suitable material.

The illustrated connector unit blocks 1 have their corner 6 rounded for ease of identification. Near to this corner, the block has a transverse bore 24 coaxial with a hollow dowel 25 formed on the face 9. The face 8 is formed with a mating recess to receive the dowel 25 of a juxtaposed block in the manner shown in FIG. 8 so that juxtaposed blocks may be positively located by interfitting of the dowels and recesses, and held together by a bolt or the like extending through the aligned bores 24 of the juxtaposed blocks.

Inserts such as shown in FIGS. 6, 7 and 9 may be retained in the ports 2, 3, 10, 11 in any suitable manner. For instance the ports and inserts may be complementarily screw-threaded; or such inserts may be shrink fitted or secured by adhesive or by welding. The manner of securing such inserts will be selected in accordance with the materials of construction. However, in the case of plastics inserts in plastics blocks the inserts are preferably force fitted and secured by welding using ultrasonic or high-frequency dielectric welding techniques. To aid security the exterior of the insert may be barbed or grovved to provide for interlocking engagement of block and insert materials.

When a welding technique is employed, the block regions surrounding the port into which an insert is to be fitted is preferably provided with an upstanding annulus of material that can be caused to flow into tight sealing engagement around the end portion of the insert during the welding operation. FIG. 12 illustrates the preferred configuration for the block in the region of a port such as a port 2 therein intended to receive an insert such as illustrated in FIGS. 7 and 9. In conformity with the dimensional indications of FIG. 9, the internal diameter of the port 2 is shown as being nominally the same as the external diameter D of the insert so that the latter is a force fit therein. Beyond the general plane of the face 4, the body is formed with an annular rib 26 of axial extent J to a flat end having an internal diameter H and an external diameter G and its outer wall convergent on the port axis at an angle N. The relationship of these dimensions is preferably as set out in the following Table 2.

TABLE 2

| Dimension | Minimum | Maximum |
| --- | --- | --- |
| G | ≧H | 1.33D |
| H | D | 1.14D |
| J | 0.06D | 0.13D |
| N | 35° | 55° |

Figure 2:
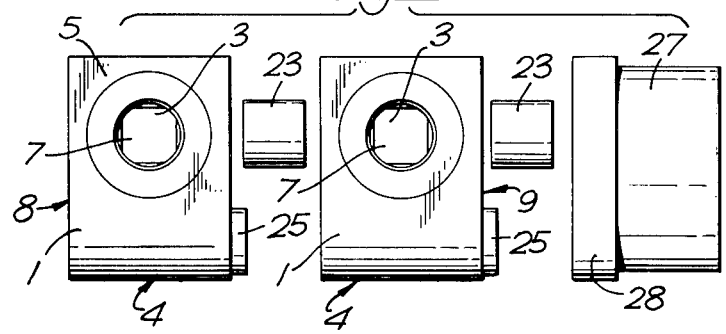
FIG. 2 is a front elevation of a pair of the connector unit blocks of FIG. 1, coupling pipes and an adaptor unit shown separated but indicating their interrelationship in an assembly.

Connector units in accordance with the invention may be associated with a range of accessories to extend their utility. For instance, as shown in FIG. 2 the connector unit may be associated with an adaptor unit 27 comprising a coupling end for interconnection with an opened coupling port 10, 11 of the connector unit block 1, and a connection end for connection to a pipe or the like, and having a flange 28 adapted to fit in juxtaposition over the coupling port-provided face 8, 9 of the connector unit block 1 so as to align a suitably disposed port in its coupling end with the opened coupling port of the connector unit. FIG. 2 illustrates how such an adaptor unit may be connected, by the intermediary of a coupling pipe 23, with the coupling port 11 of a connector unit block 1 to provide a connection between the passage 7 of that coupling unit and a much larger diameter pipe on to which the adaptor unit 27 may be fitted.

It should be noted that the use of inserts in the ports 2, 3 especially, for co-operation with pipes to be connected to those ports, enables a range of inserts to be provided for selective fitment to a connector unit block of standard dimensions to adapt this for attachment to pipes of various sizes and types within a range. Although internally barbed inserts suitable for co-operation with soft or resilient flexible pipes have been particularly described, other forms of insert (e.g. internally screw-threaded) may be fitted to the ports 2, 3 of a connector unit block to suit other types of pipe.

Moreover, when all the ports 2, 3, 10, 11 in the connector unit block 1 are internally barbed, e.g. by being fitted with internally barbed inserts, the barb arrangement of the pipe-receiving ports 2, 3 may be different from that of the coupling ports 10, 11 because, in the usual case, a coupling port will not be used for connection to a pipe requiring to be supported against flexing in the region engaged by the barb or barbs. Thus, because the coupling ports will in general only be required to engage a short pipe length interconnecting two closely adjacent coupling ports of juxtaposed connector units, or the flange-supported spigot-like coupling end of an adaptor unit, the internal barb or barbs of a coupling port may be disposed close to the face of the connector unit. Therefore, the coupling ports may be relatively shallow, permitting a connector unit block of relatively small thickness to accommodate aligned coupling ports in its respective opposed parallel faces, with the passage 7 that interconnects the pipe-receiving ports running in the thickness of the block between the blind ends of the coupling ports.

I claim:
1. A pipe connector unit comprised of a block bounded by planar side faces,
   a. said side faces including a first pair of opposed parallel side faces,
   b. each side face of said first pair being formed with a blind coupling port, said block including two knock-out diaphragms normally sealing said coupling ports,
   c. said side faces further including a pair of other side faces each formed with a pipe-receiving port,
   d. said block being formed with an internal passage interconnecting said pipe-receiving ports and bounded by said diaphragms, whereby said coupling ports are in communication with said internal passage when said diaphragms are knocked out.
2. The pipe connector unit of claim 1, in which said pipe-receiving ports are internally barbed.
3. The pipe connector unit of claim 1, further comprising internally barbed inserts fitted in said pipe-receiving ports.
4. The pipe connector unit of claim 1, further comprising internally barbed inserts fitted in said blind coupling ports.
5. The pipe connector unit of claim 1, wherein the block is prismatic and the other planar side faces are a second pair of adjacent side faces extending at right angles to each other and to the parallel side faces of the first pair.
6. The pipe connector unit of claim 5, wherein the blind coupling ports are axially aligned and the pipe-receiving ports have axes extending at right angles to each other and intersecting in the axis of alignment of the coupling ports.
7. The pipe connector unit of claim 1, wherein the blind coupling ports are internally barbed.
8. The pipe connector unit of claim 1, further comprising a locating dowel on one of the parallel planer side faces and a complementary recess in the other one of the parallel side faces whereby adjacent ones of the units may be stacked in juxtaposed relationship.
9. The pipe connector unit of claim 8, wherein said passage is a through-passage and the dowel and recess are coaxial with the through-passage.
10. The pipe connector unit of claim 1, wherein the diaphragms are readily frangible into fragments removable through the internal passage.

* * * * *